M. B. REED.
NUT LOCK.
APPLICATION FILED NOV. 1, 1919.

1,342,508.

Patented June 8, 1920.

INVENTOR
Melvin B. Reed
BY
ATTORNEY

UNITED STATES PATENT OFFICE.

MELVIN B. REED, OF LATROBE, PENNSYLVANIA.

NUT-LOCK.

1,342,508.  Specification of Letters Patent.  Patented June 8, 1920.

Application filed November 1, 1919. Serial No. 334,924.

*To all whom it may concern:*

Be it known that I, MELVIN B. REED, a citizen of the United States, residing at Latrobe, Westmoreland county, Pennsylvania, have invented a new and useful Improvement in Nut-Locks, of which the following is a specification.

My invention relates to an improved nut-lock, and seeks especially to provide a new construction which will permit the nut to be separated from the bolt in an emergency that makes it absolutely necessary so to do, while it may be practically integral with the bolt at all other times.

The invention consists of the parts and combinations of parts hereinafter described and pointed out in the claims terminating this specification, with such fullness, clearness, and particularity as will enable others skilled in the art to which the invention appertains to make and use the same.

The invention has been illustrated in its preferred embodiment in the accompanying drawings, wherein similar reference characters have been employed to denote corresponding parts; and wherein, Figure 1 is a top plan view of the nut with a portion broken away to show the spring and pawl in position.

Figures 1, 2, 3, 4, 5:
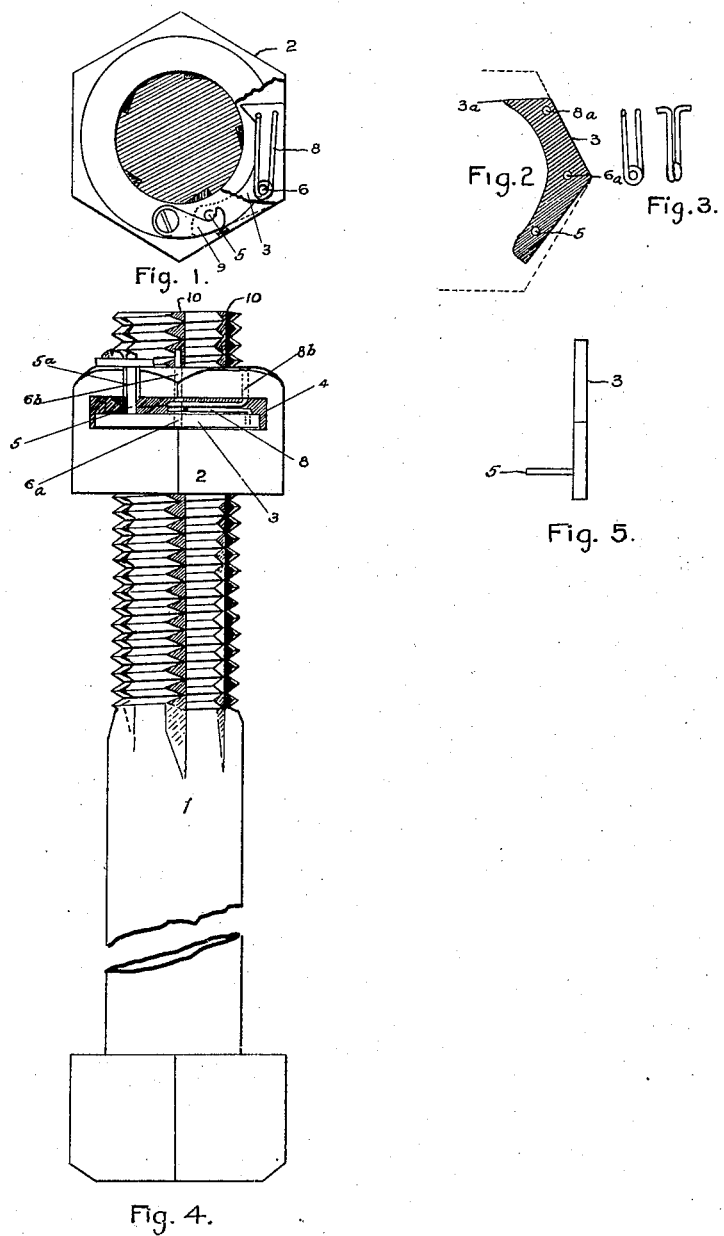
Fig. 2 is a top plan view of the pawl.
Fig. 3 shows detail views of the spring.
Fig. 4 is a side elevation of the bolt and nut.
Fig. 5 is a side view of a stud and the pawl.

As shown by the drawing, numeral 1 designates a common bolt provided with a plurality of longitudinally parallel grooves or channels of triangular form in cross section extending through the threaded portion of the bolt. Said grooves or channels are constructed with one wall at right angles to the periphery of the bolt, and the other wall at an obtuse angle thereto.

The bolt is provided with a hexagonal head and the nut used in connection therewith is of like form.

This form is specifically adopted for it is my experience of many years that such form is handled more effectively than a square bolt-head and a square nut in limited space for the movement of a wrench.

A horizontal recess or slot is made in one side of the nut and communicates with the bore, and in said recess is pivotally secured pawl 3, and coil spring 8 to actuate the pawl. Stud 6 serves for a pivot, one end of which enters aperture $6^b$ in the roof of the recess while the other end passes through aperture $6^a$ in pawl 3.

The spring 8 is provided with two arms of equal length, the free ends of which are bent at right angles to the arms and in opposite directions so as to enter the apertures $8^a$ and $8^b$.

The end of the pawl adapted for engagement with the grooves or channels in the bolt is designated as $3^a$.

Stud 5 is integrally secured to pawl 3 and extends upwardly through vertical slot $5^a$ in the side of the nut to a point above the nut, to serve as a post to which dog 9 is hooked when it is desired to prevent the operation of the pawl.

Dog 9 is affixed to the upper surface of nut 2 in a movable position and is adapted to be hooked to stud 5, that rises above the surface. When so hooked the pawl is prevented from engaging any groove or channel in the bolt, and the nut may be moved forward or backward on the bolt as an ordinary nut upon an ordinary bolt; by releasing the dog from stud 5, the nut may be advanced on the bolt but it can not be reversed so as to free it from the bolt, for the moment that is attempted the pawl drops into one of the channels and the nut becomes fixed to the bolt.

Consequently, when it is desired to separate the nut from the bolt it will be only necessary to hook the dog to stud 5 so as to prevent the operation of the pawl as before explained.

From the foregoing, taken in connection with the drawings, the simplicity of the device as well as its efficiency and its many advantages will be obvious to any one skilled in the art to which it pertains.

I claim as my invention:—

1. In a device of the character described, in combination, a bolt having a threaded end and a plurality of longitudinally parallel channels through the threaded portion, said channels being substantially of trianguloid form in cross section, a nut provided with wrench-receiving faces, and an internally threaded opening to receive the bolt, and having a recess or slot in the side thereof communicating with the opening therein, a pivoted spring-actuated pawl within the recess, and a dog on the exterior of the nut adapted to control the operation of the pawl.

2. In a device of the character described, in combination, a bolt having a threaded end and a plurality of longitudinally parallel channels through the threaded portion, said channels being substantially of trianguloid form in cross section, a nut provided with wrench-receiving faces, and an internally threaded opening adapted to receive the bolt, and having a recess or slot in the side thereof communicating with the opening therein, a pivoted spring-actuated pawl within the recess which is adapted to permit the nut to advance on the bolt and to prevent its separation therefrom, and a dog on the exterior of the nut which is adapted to control the operation of the pawl.

3. In a device of the character described, in combination, a bolt having a hexagonal head, a threaded end, and a plurality of longitudinally parallel channels through the threaded portion, said channels being substantially of trianguloid form in cross section, a hexagonal nut provided with wrench-receiving faces and an internally threaded opening adapted to receive the bolt, and having a recess or slot in the side thereof communicating with the opening therein, a pivoted spring-actuated pawl within the recess, and a dog on the exterior of the nut adapted to control the operation of the pawl.

4. In a device of the character described, in combination, a bolt having a hexagonal head, a threaded end, and a plurality of longitudinally parallel channels through the threaded portion, said channels being substantially of trianguloid form in cross section, a hexagonal nut provided with wrench-receiving faces, and an internally threaded opening adapted to receive the bolt, and having a recess or slot in the side thereof communicating with the opening therein, a pivoted spring-actuated pawl within the recess which is adapted to permit the nut to advance on the bolt and to prevent its separation therefrom, and a dog on the exterior of the nut which is adapted to control the operation of the pawl.

5. In a device of the character described, in combination, a bolt having a threaded end and a plurality of longitudinally parallel channels of substantially trianguloid form in cross section, a nut provided with wrench receiving faces and an internally threaded opening to receive the bolt, and having a recess in the side thereof communicating with the opening therein, a pivoted spring-actuated pawl within the recess whereby the nut may be moved forward and backward at will and dog 9 and stud 5 which are adapted to control the operation of the pawl.

MELVIN B. REED.